(12) United States Patent
Liao et al.

(10) Patent No.: US 10,596,670 B2
(45) Date of Patent: Mar. 24, 2020

(54) CONTROL SYSTEM AND METHOD FOR IMPROVING THERMAL STABILITY

(71) Applicant: INDUSTRIAL TECHNOLOGY RESEARCH INSTITUTE, Hsinchu (TW)

(72) Inventors: Yan-Sin Liao, Taichung (TW); Shih-Jie Wei, Taichung (TW); Kun-Ying Li, Chiayi (TW); Shi-Jie Luo, Yuanlin (TW); Hsi-Hung Hsiao, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 8 days.

(21) Appl. No.: 15/702,523

(22) Filed: Sep. 12, 2017

(65) Prior Publication Data

US 2019/0047104 A1 Feb. 14, 2019

(30) Foreign Application Priority Data

Aug. 9, 2017 (TW) .............................. 106126929 A

(51) Int. Cl.
*B23Q 11/14* (2006.01)
*B23Q 11/12* (2006.01)
*G05B 19/404* (2006.01)

(52) U.S. Cl.
CPC .......... *B23Q 11/141* (2013.01); *B23Q 11/126* (2013.01); *G05B 19/404* (2013.01)

(58) Field of Classification Search
CPC ....... B23Q 11/12; B23Q 11/126; B23Q 11/14; B23Q 11/141; G05B 19/00; G05B 19/404

(Continued)

(56) References Cited

U.S. PATENT DOCUMENTS 5,040,379 A 8/1991 Fukunaga et al.
5,197,537 A 3/1993 Chigira et al.
(Continued)

FOREIGN PATENT DOCUMENTS

CN 1175960 A 3/1998
CN 1402813 A 3/2003
(Continued)

OTHER PUBLICATIONS

Machine Translation CN105563232A (Year: 2016).*
(Continued)

*Primary Examiner* — Keith M Raymond
*Assistant Examiner* — Gustavo A Hincapie Serna
(74) *Attorney, Agent, or Firm* — Maschoff Brennan

(57) ABSTRACT

The disclosure is a thermal stability control system and a control method thereof for a machine tool. The control system mainly consists of a machine cooling sub-system composed of a pump, at least a cooling loop and a tank for storing cooling fluid, a cooling fluid cooling and heating sub-system, a heater and a micro controller. The cooling fluid cooling and heating sub-system further consists of a condenser, an evaporator, a directional valve, an expansion valve and a compressor. The micro controller dominates corresponding operation combinations of turning on/off the heater, enabling/disenabling the cooling fluid cooling and heating sub-system as a heat pump or a cooler by activating/releasing the directional vale, and adjusting upward/downward the driving frequency of an inverter duty motor to drive the pump to change the flow rate of cooling fluid through the cooling loop according the real time load of the machine tool.

11 Claims, 2 Drawing Sheets

(58) Field of Classification Search
USPC ..... 62/98, 99, 159, 177, 178, 183, 184, 185, 62/201, 430, 434; 165/200, 267, 287, 165/288, 292, 293

See application file for complete search history.

(56) References Cited

U.S. PATENT DOCUMENTS

| | | | |
|---|---|---|---|
| 5,922,819 A | 7/1999 | Wünsch et al. | |
| 6,210,085 B1* | 4/2001 | Haninger | B23Q 11/14 29/DIG. 102 |
| 6,418,748 B1* | 7/2002 | Kramer | F25D 17/02 62/185 |
| 8,167,773 B2* | 5/2012 | Kothari | B60W 20/30 477/98 |
| 9,238,398 B2* | 1/2016 | Lu | B60H 1/00592 |
| 9,956,660 B2* | 5/2018 | Koyama | B23Q 11/0007 |
| 10,209,700 B2* | 2/2019 | Tajima | G05B 19/4062 |
| 2002/0166422 A1* | 11/2002 | Schuettel | B23Q 11/141 82/1.11 |
| 2003/0079485 A1 | 5/2003 | Nakata | |
| 2006/0178761 A1* | 8/2006 | Besuchet | B23Q 11/14 700/29 |
| 2009/0126378 A1* | 5/2009 | Oh | F25B 25/005 62/115 |
| 2014/0260385 A1* | 9/2014 | Umeda | F25B 49/02 62/180 |
| 2016/0121445 A1 | 5/2016 | Sogabe et al. | |
| 2018/0039293 A1* | 2/2018 | Pierse | B23Q 11/141 |

FOREIGN PATENT DOCUMENTS

| | | | | |
|---|---|---|---|---|
| CN | 1566865 | A | | 1/2005 |
| CN | 201792256 | U | | 4/2011 |
| CN | 102155472 | A | | 8/2011 |
| CN | 202411963 | U | | 9/2012 |
| CN | 202878023 | U | | 4/2013 |
| CN | 104006592 | A | | 8/2014 |
| CN | 104006592 | A | * | 8/2014 |
| CN | 105042914 | A | | 11/2015 |
| CN | 105563232 | A | * | 5/2016 ........... B23Q 11/127 |
| CN | 105563232 | A | | 5/2016 |
| CN | 205373127 | U | | 7/2016 |
| EP | 1927431 | A1 | | 6/2008 |
| JP | 2001-165058 | A | | 6/2001 |
| TW | 567927 | U | | 12/2003 |
| TW | 347465 | U | | 12/2008 |
| TW | 201016379 | A | | 5/2010 |
| TW | M455579 | U | | 6/2013 |
| TW | 201348906 | A | | 12/2013 |

OTHER PUBLICATIONS

Machine Trnaslation CN104006592A (Year: 2014).*
TW Office Action dated Dec. 20, 2017 in application No. 106126929.
Daniel B. Boman, et al. (Feb. 28, 2017). "A method for comparison of absorption heat pump working pairs". International Journal of Refrigeration 77 (2017), pp. 149-175.
N. Li, et al. (Mar. 18, 2015). "Experimental study of the energy separation in a vortex tube". International Journal of Refrigeration 55 (2015), pp. 93-101.
J. Bryan. (1990). "International Status of Thermal Error Research". CIRP Annals—Manufacturing Technology vol. 39, Issue 2 (1990), pp. 645-656.
Cordin Arpagaus, et al. (May 30, 2016). "Multi-temperature heat pumps: A literature review". International Journal of Refrigeration 69 (2016), pp. 437-465.
Andrej Kitanovski, et al. (Jun. 16, 2015). "Present and future caloric refrigeration and heat-pump technologies". International Journal of Refrigeration 57 (2015), pp. 288-298.
Zhiwei Huang, et al. (Mar. 8, 2017). "Review of nature-inspired heat exchanger technology". International Journal of Refrigeration 78 (2017), pp. 1-17.
G. Bagarella, et al. (Feb. 23, 2016). "Sizing strategy of on-off and modulating heat pump systems based on annual energy analysis". International Journal of Refrigeration 65 (2016), pp. 183-193.
Dr. Josef Mayr, et al. (2012). "Thermal Issues in Machine Tools". CIRP Annals—Manufacturing Technology vol. 2 (2012), pp. 1-24.
CN Office Action in application No. 201710778435.2 dated Aug. 2, 2019.
CN Office Action in application No. 201710778435.2 dated Dec. 2, 2019.

* cited by examiner

CONTROL SYSTEM AND METHOD FOR IMPROVING THERMAL STABILITY

CROSS-REFERENCE TO RELATED APPLICATION

This application claims the priority benefits of Taiwan application serial no. 106126929, filed on Aug. 9, 2017. The entirety of the above-mentioned patent application is hereby incorporated by reference herein and made a part of this specification.

TECHNICAL FIELD

The disclosure relates a control system and a control method using the same, and more particularly relates to a control system and a control method thereof for improving the thermal stability of the body of a machine tool.

BACKGROUND

Machining precision is normally sensitive to the temperature of the body of a cutting machine or a machine tool under different operational conditions. From booting up at cold or at an idle status to begin to cut a workpiece, a machine tool will be usually operated to run idly without cutting out any material from a workpiece for a long period of time only just to warm up the machine tool quickly as possible, and therefore it always wastes time and electricity. However, even after a machine tool has been warmed up, a conventional thermostatic control manner with regard only to a constant temperature can't be adjusted flexibly depends on real-time loads of the machine tool in time, as a result, the thermal deformation of the body of the machine tool changes ceaselessly to affect the machining precision.

Obviously, a control system and a control method thereof which can warm up a machine tool much quicker, and after that can further improve a stable thermal deformation of the body of the machine tool by adjusting the flow rate of cooling fluid in time according to the variation of loads of the machine tool are widely required.

SUMMARY

The disclosure introduces a thermal stability control system for a machine tool which comprises a machine cooling sub-system adapted with a tank for storing cooling fluid, at least a cooling loop for removing heat from the machine tool, and a pump driven by an inverter duty motor to propel cooling fluid throughout the sub-system. The control system comprises a cooling fluid cooling and heating sub-system composed of a compressor, a directional/selector valve, a condenser, an expansion valve, an evaporator and pipes in which coolant flows to link the all above components, a heater in the tank and a micro controller to dominate a control method of the disclosure.

According to the structure of the thermal stability control system, a thermal stability control method dominated by the micro controller comprises the flowing steps: receiving operational data of the machine tool and the temperature of cooling fluid flowing out the cooling loop; and deciding with a comparison of the temperature of cooling fluid and a default temperature, and/or counting the elapsed time thereof, so as to start a phase of warming-up or a phase of cooling-down for the machine tool to save time and electricity.

To make the disclosure more comprehensible, embodiments accompanied with drawings are described in detail as follows.

BRIEF DESCRIPTION OF THE DRAWINGS

The accompanying drawings are included to provide a further understanding of the disclosure and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

The following paragraphs provide embodiments as detailed descriptions. The embodiments only serve as exemplary descriptions, and should not be construed as limitations to the scope that the disclosure intends to cover.

Figure 1:
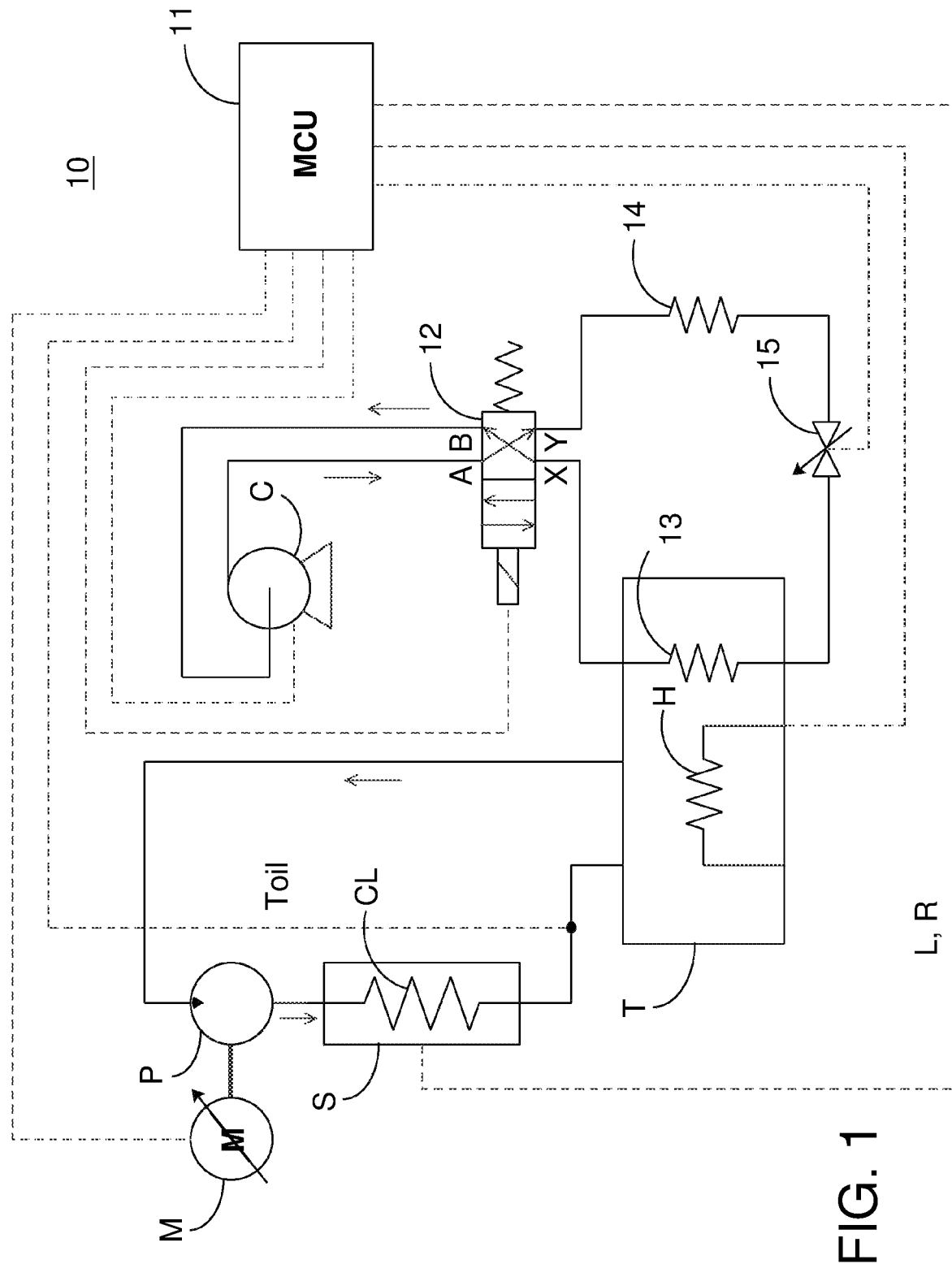
FIG. 1 illustrates a schematic diagram of a control system according to an embodiment of the disclosure.

FIG. 1 illustrates a control system according to an embodiment of the disclosure. The disclosure introduces a thermal stability control system 10 mounted, for example, on any portions which occur thermal deformation of a machine tool. The thermal deformation caused by heat which is normally transferred from the electric motor, bearings and the machining spot of a machine tool, and the spindle composed of all above heat sources is the major one. The thermal stability control system 10 of the disclosure is mainly focused on how to keep a stable thermal deformation of the spindle in a whole machining cycle as a goal but not limited to. Keeping a stable thermal deformation of the spindle in working means that the quality of machining precision can be certainly ensured.

The thermal stability control system 10 of the disclosure in FIG. 1 generally consists of a machine cooling sub-system (not numbered in the figure), a cooling fluid cooling and heating sub-system (not numbered in the figure), a heater H and a micro controller 11. The machine cooling sub-system can be mounted in or on a machine tool in advance or additionally, and is mainly composed of a tank T, a pump P, at least a cooling loop CL and pipes in which cooling fluid flows inside to connect all above components in serial order. The cooling loop CL, for example is adapted to the spindle S inside or other portion as to remove heat with cooling fluid. The cooling fluid propelled by the pump P goes from the tank T in which the cooling fluid is stored, through the cooling loop CL to remove heat therefrom and backs to the tank T to finish a closed cooling cycle. The pump P, for example, is further driven by a variable-frequency motor or an inverter duty motor M, and with variable driving frequency to the inverter duty motor M, the pump P can change the flow rate in time of cooling fluid flowing through the cooling loop CL according to the actual or real-time loads of a machine tool, so as to speed up to cool down the spindle S or other possible heat sources of the machine tool.

The cooling fluid cooling and heating sub-system of the disclosure is applied to cool down or warm up cooling fluid in the tank T of the machine cooling sub-system. The cooling fluid cooling and heating sub-system is mainly composed of a compressor C, a two position solenoid directional/selector valve 12, an evaporator 13, a condenser 14, an expansion valve 15 and pipes in which coolant flows inside to connect all above components in serial order. The evaporator 13 or the condenser 14 under two specific situations is immersed into cooling fluid in the tank T, and the position of the solenoid directional valve 12 can decide the situations on which the roles of the evaporator 13 and the condenser 14 will be applied individually in the tank T. For example in FIG. 1, the solenoid directional valve 12 is a two position valve, and it means there are two situations needed to be decided. One situation shown in the figure is that the solenoid directional valve 12 is not activated and the spring (not numbered in the figure) switches or releases the valve 12 back to the original position. At the original position, the coolant in pipes is compressed by the compressor C and flows through port A, port Y, the condenser 14, the expansion valve 15, the evaporator 13, port X, port B and back to the compressor C in succession, and the evaporator 13 act as a cooler to cool down the cooling fluid in the tank T. Similarly, the other situation is that the solenoid directional valve 12 is activated by an order signal and the solenoid (not numbered in the figure) switches the valve 12 to the activated position. At the activated position, the coolant with high pressure flows through the evaporator 13 directly from the compressor C and the evaporator 13 now act as a heater, or the entire cooling fluid cooling and heating sub-system act as a heat pump to warm up the cooling fluid in the tank T. By a better position control to the solenoid directional valve 12, the roles of the evaporator 13 and the condenser 14 in the tank T can be alternately exchanged even the valve 12 is replaced with a three or more position valve.

The heater H of the disclosure, for example, is an electric heater mounted in the tank T and is immersed into the cooling fluid so as to heat the cooling fluid when is turned on. As shown by dot lines in the figure, the micro controller 11 connects electrically to the inverter duty motor M, the compressor C, the solenoid directional valve 12, the expansion valve 15 and the heater H individually, and receives online operational data through sensors (not shown in the figure), such as the temperature of cooling fluid Toil at the outlet of the cooling loop CL, the load L and the revolution R of the spindle S. With these online operational data and further refers to the specification or the characteristic of a machine tool, a relationship or a reference table of different variables can be built up for a complete control and compensation.

The micro controller 11 of the thermal stability control system 10 can adjust driving frequency to the inverter duty motor M through an electric connection, when the real-time load of a machine tool rises and causes heat occurred, the micro controller 11 increases driving frequency to speed up the revolution of the pump P to increase the flow rate of the cooling fluid through the cooling loop CL, and on the contrary, when the load declines, the micro controller 11 provides a lower or a default driving frequency to the inverter duty motor M to avoid over cooling and save electricity additionally. The steady-flow thermal energy equation shown below can explain that the transferred heat q is directly proportional to the mass flow of cooling fluid in under a same specific period of time.

$$q = \dot{m} \cdot Cp \cdot \Delta T$$

In the above equation, q is the transferred heat per second (Joule/sec); $\dot{m}$ is the mass flow of cooling fluid per second (kg/sec); Cp is the specific heat of the cooling fluid at a constant pressure (Joule/kg·K) and $\Delta T$ is the temperature difference of cooling fluid at the both openings of the cooling loop CL (K).

With reference to the above equation, it is clear that to increase the mass flow of cooling fluid through the cooling loop CL can simultaneously increase the transferred heat from the cooling loop CL, and as a result, it is needed to increase driving frequency to the inverter duty motor M as to increase the revolution of the pump P. Otherwise, the micro controller 11 provides a lower or the lowest driving frequency to the inverter duty motor M to avoid over cooling and save electricity additionally as if the load L of a machine tool declines.

As described above, the micro controller 11 controls the inverter duty motor M with varied driving frequency as to adapt in time the flow rate of cooling fluid according to the actual load of a machine tool. Therefore it is needed to build up a relationship or a reference table to be applied with in advance of those variables, such as the load and the revolution of the spindle, the driving frequency of the inverter duty motor and so on. The disclosure, for example, introduces a regression analysis to build such a relationship so as to obtain an appropriate new driving frequency after refers to those other variables and the specification or the characteristic of the machine tool. A sample relationship shown below is built through an experimental regression analysis with variables which are directly or indirectly received from sensors and is also based on a machine tool with a certain specification.

$$F = 2 \times 10^{-7} \times R^2 + 8 \times 10^{-4} \times R + 0.1 \times L + B$$

In the above sample relationship, F is the driving frequency of inverter duty motor (Hz); R is the revolution of spindle (RPM); L is the load of spindle (%) and B is the lowest driving frequency of inverter duty motor (Hz).

With reference to the above sample relationship, the micro controller 11 sends a lower or the lowest driving frequency B to the inverter duty motor M if the load L and the revolution R of the spindle S stay low, however if not, the driving frequency then will be adjusted higher.

Once a relationship is built up with an appropriate analysis, the moment to start a control for thermal stability is depended on a comparison of the temperature of cooling fluid Toil flowing out of the cooling loop CL and a default temperature Tset which is decided with reference to the specification or the characteristic of a machine tool.

Figure 2:
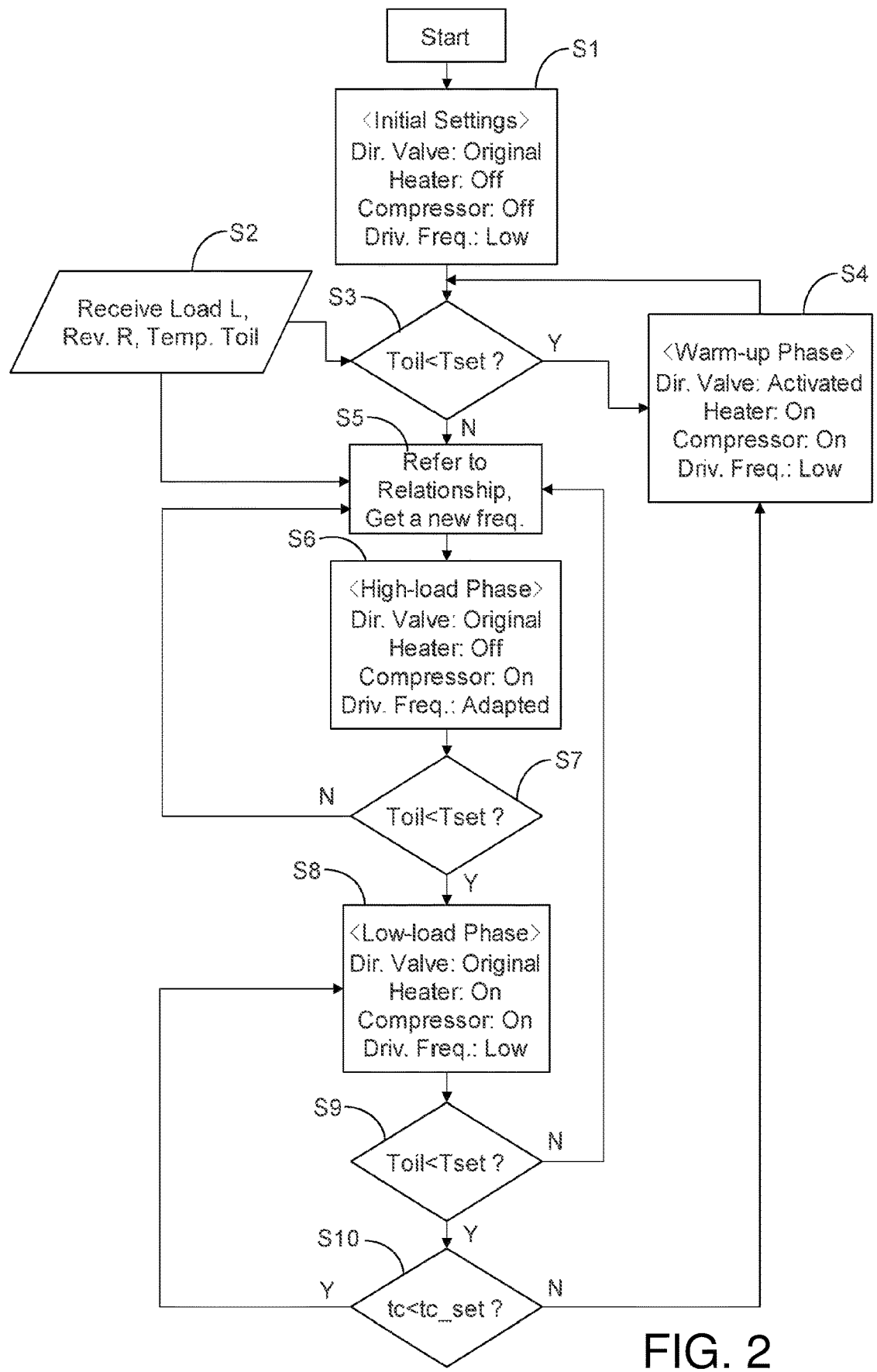
FIG. 2 illustrates a flow chart of a control method according to the embodiment in FIG. 1 of the disclosure.

With the above description and the illustration of FIG. 1, the thermal stability control system 10 of the disclosure has been disclosed and will be based on to further descript a thermal stability control method hereafter with reference to FIG. 2.

FIG. 2 illustrates a flow chart of the thermal stability control method, and the control method is dominated mainly by the micro controller 11 of the thermal stability control system 10 in FIG. 1. With different operations of a machine tool, there are three major corresponding operational phases such as the phase of warm-up, the phase of low-load and the phase of high-load for example. Below is the detail descriptions of these phases.

[Warm-Up Phase]

On and after the beginning of operation of a machine tool according to the thermal stability control system 10 of the disclosure, the micro controller 11 resets all the configurations to default settings at step S1, such as switches or releases the solenoid directional valve 12 back to the original position as shown in FIG. 1, i.e., the two position solenoid directional valve 12 is not activated, turns off the heater H and the compressor C, and drives the inverter duty motor M at a lower or the lowest driving frequency. At step S2, the micro controller 11 receives continuously the online operation data from sensors, such as the load L and the revolution R of the spindle S, and the temperature of cooling fluid Toil as to compare with the default temperature Tset at step S3 in any fixed interval of time. If the temperature of cooling fluid Toil is not greater than the default temperature Tset, the micro controller 11 at step S4 turns on both the heater H and the compressor C, and activates the solenoid directional valve 12 to enable the evaporator 13 to be an additional heater, i.e., to make the entire cooling fluid cooling and heating sub-system to be a heat pump to warm cooling fluid in the tank T as quickly as possible in this phase.

[High-Load Phase]

At step S3, if the temperature of cooling fluid Toil becomes higher and even greater than the default temperature Tset, which may be caused by that the load L of the spindle S rises up or the cooling fluid is over heated, the micro controller 11 decides a new higher driving frequency after referred to the relationship at step S5 to adapt to the variation of the load L, and sends the new higher driving frequency to the inverter duty M to speed up the revolution R of the pump P at step S6. The micro controller 11 at this step also turns off the heater H but turns on the compressor C, and releases the solenoid directional valve 12 to enable the evaporator 13 to be a cooler in the tank T, so as to increase the flow rate of cooling fluid in time to cool down the spindle S. If the temperature of cooling fluid Toil is still high and greater than the default temperature Tset at step S7, the micro controller 11 starts a new cooling cycle by obtaining another new driving frequency again at step S5 and consequently executes step S6 again.

[Low-Load Phase]

At step S7, if the temperature of cooling fluid Toil declines and is not greater than the default temperature Tset, which means the load L of the spindle S goes down, the micro controller 11 turns on merely the heater and orders the inverter duty motor M runs at a constant or the lowest driving frequency at step S8. Furthermore, if the temperature of cooling fluid Toil is keeping lower than the default temperature Tset at step S9 and the elapsed time tc which is a time interval of this temperature status exceeds a default period of time tc_set, for example 10 minutes at step S10, which means the load L of the spindle S is being low or even the operation of the machine tool has been suspended too long, the micro controller 11 backs to step S4 to activate the solenoid directional valve 12 to enable the evaporator 13 to be an additional heater to warm up cooling fluid as to avoid the thermal deformation of the spindle S changes and therefore save time and electricity.

As the thermal stability control method of the disclosure is described above and under the phase of low-load of a machine tool, it is optional to turn on the heater H merely and/or corporately to further activate the solenoid directional valve 12 to enable a heat pump, and vice versa, if the temperature of cooling fluid Toil is not greater than the default temperature Tset. Contrarily, if the temperature of cooling fluid Toil is greater than the default temperature Tset under the phase of high-load, it is also optional to release merely the solenoid directional valve 12 back to make the evaporator 13 to be a cooler, and/or corporately to increase further the driving frequency to the inverter duty motor M to increase the flow rate of cooling fluid through the spindle S, and vice versa. Therefore as a matter of applications of the disclosure but not limited to, turning on the heater H and enabling a heat pump are independent to each other and can be applied with together. Similarly, releasing the solenoid directional valve 12 to make the evaporator 13 as a cooler and increasing the flow rate of cooling fluid are also independent to each other and therefore can be applied with together as well.

Although the disclosure introduces a two position directional/selector valve, however to apply instead a three or more position valve, no matter with electrical or hydraulic manner, or even to turn directly on/off the compressor C, which may probably make changes from the above description and FIG. 2, the merits of the disclosure by using the heater H incorporated with a heat pump to speed warming up, and adapting a new driving frequency to increase the flow rate of cooling fluid and further releasing the valve 12 to speed cooling down, will not be substantially affected.

The thermal stability control system 10 and the thermal stability control method for a machine tool of the disclosure not only can complete a warming-up much quickly, but can adjust the flow rate or the quantity of cooling fluid according to the real-time load in time as to keep the thermal deformation of specific portions stable within a certain range, and consequently to keep the machine precision.

Although the present disclosure has been described with reference to the above embodiments, it will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A thermal stability control system for a machine tool which comprises a machine cooling sub-system adapted with a tank for storing cooling fluid and at least a cooling loop for cooling the machine tool, the control system further comprising:

a cooling fluid cooling and heating sub-system arranged to have a condenser, an evaporator, and a directional valve, wherein the condenser or the evaporator is mounted inside the tank;

a heater mounted inside the tank for heating the cooling fluid; and a micro controller connected electrically to the machine cooling sub-system, the cooling fluid cooling and heating sub-system and the heater individually;

wherein the micro controller is arranged to control the machine cooling sub-system, the cooling fluid cooling and heating sub-system and the heater according to a relationship and operational data of the machine tool, and the micro controller is configured to control the following steps:

receiving a real-time load and a revolution of the machine tool, and a temperature of the cooling fluid flowing out the at least a cooling loop;

deciding whether the temperature of the cooling fluid is not greater than a default temperature, if yes, turns on the heater and optionally further activates the directional valve to enable the condenser to be an additional heater to warm up the cooling fluid in the tank, if not, changes the driving frequency of an inverter duty motor according to the relationship and releases the directional valve to enable the evaporator to cool down the cooling fluid in the tank; and re-deciding whether the temperature of the cooling fluid is not greater than the default temperature and an elapsed time thereof exceeds a default period of time, if yes, turns on the heater and further activates the directional vale to enable the condenser to be the additional heater to warm up the cooling fluid in the tank, if not, goes back to the above deciding step.

2. The thermal stability control system according to claim 1, wherein the machine cooling sub-system further comprising a pump connected to the at least a cooling loop.

3. The thermal stability control system according to claim 2, wherein the pump is driven by the inverter duty motor connected electrically to the micro controller.

4. The thermal stability control system according to claim 1, wherein the cooling fluid cooling and heating sub-system further comprising a compressor and an expansion valve, and the compressor, the directional valve and the expansion valve are connected to the condenser and the evaporator in serial order.

5. The thermal stability control system according to claim 4, wherein the micro controller connects electrically to the directional valve and the compressor.

6. The thermal stability control system according to claim 1, wherein the directional valve is one of a two position solenoid directional valve and a three position solenoid directional valve.

7. The thermal stability control system according to claim 3, wherein the operational data consists of the real-time load and the revolution of the machine tool and the temperature of the cooling fluid flowing out the at least a cooling loop, and the relationship is built according to the real-time load, the revolution and characteristics of the machine tool.

8. A thermal stability control method for a machine tool which comprises a machine cooling sub-system adapted with a tank for storing cooling fluid and at least a cooling loop for cooling the machine tool, and a micro controller, the micro controller configured to control the following steps of the control method:

receiving a real-time load and a revolution of the machine tool, and a temperature of the cooling fluid flowing out the at least a cooling loop;

deciding whether the temperature of the cooling fluid is not greater than a default temperature, if yes, turns on a heater and optionally further activates a directional valve to enable a condenser to be an additional heater to warm up the cooling fluid in the tank, if not, changes the driving frequency of an inverter duty motor according to a relationship and releases the directional valve to enable an evaporator to cool down the cooling fluid in the tank; and re-deciding whether the temperature of the cooling fluid is not greater than the default temperature and an elapsed time thereof exceeds a default period of time, if yes, turns on the heater and further activates the directional vale to enable the condenser to be the additional heater to warm up the cooling fluid in the tank, if not, goes back to the above deciding step.

9. The thermal stability control method according to claim 8, wherein the relationship is built according to the real-time load and the revolution of the machine tool, and characteristics of the machine tool.

10. The thermal stability control method according to claim 8, wherein the inverter duty motor drives a pump to propel the cooling fluid.

11. The thermal stability control method according to claim 8, wherein the directional valve is one of a two position solenoid directional valve and a three position solenoid directional valve.

* * * * *